Figure 1:
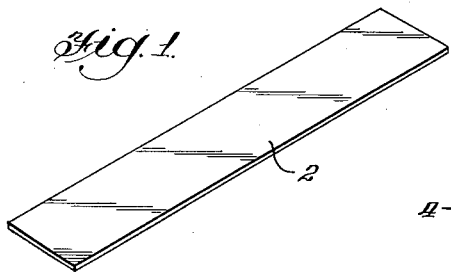

May 9, 1961  D. S. COX  2,983,033
METHOD OF MANUFACTURING DISHED DISKS AND THE LIKE
Filed Jan. 4, 1960  6 Sheets-Sheet 1

INVENTOR.
Darwin S. Cox
BY Neil J. Driscoll
Atty.

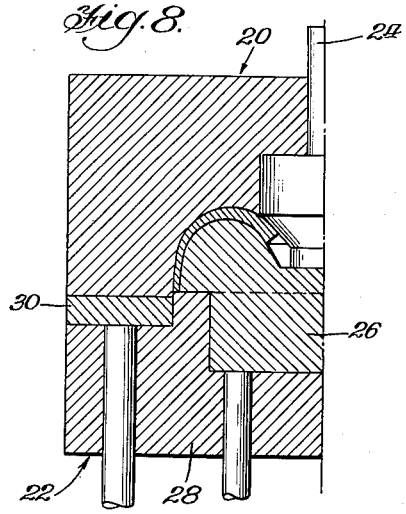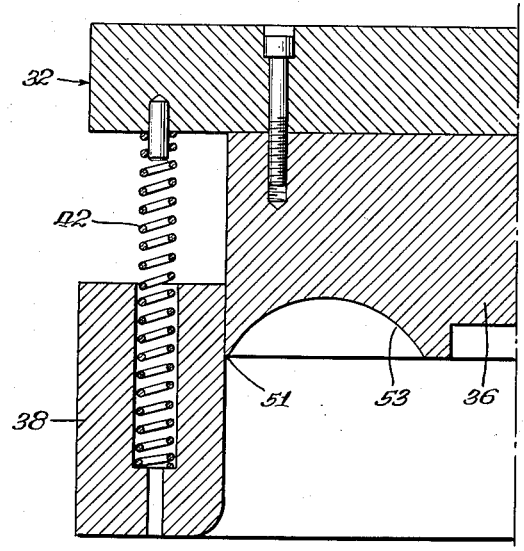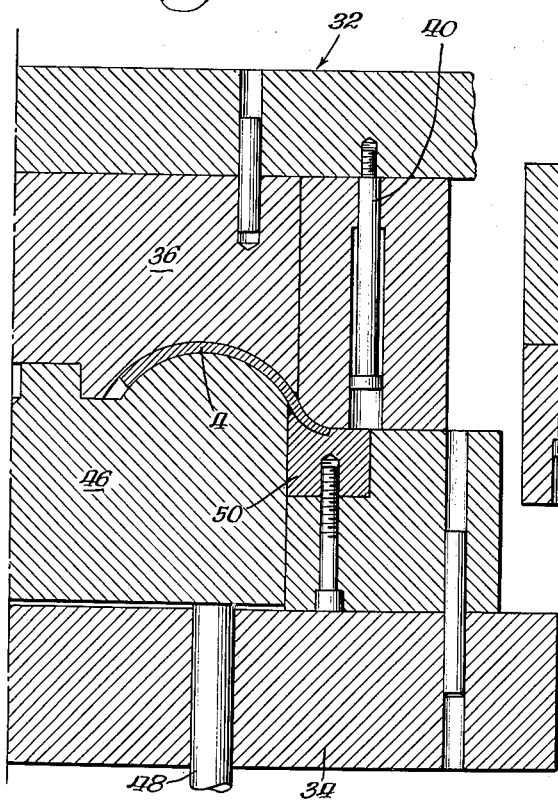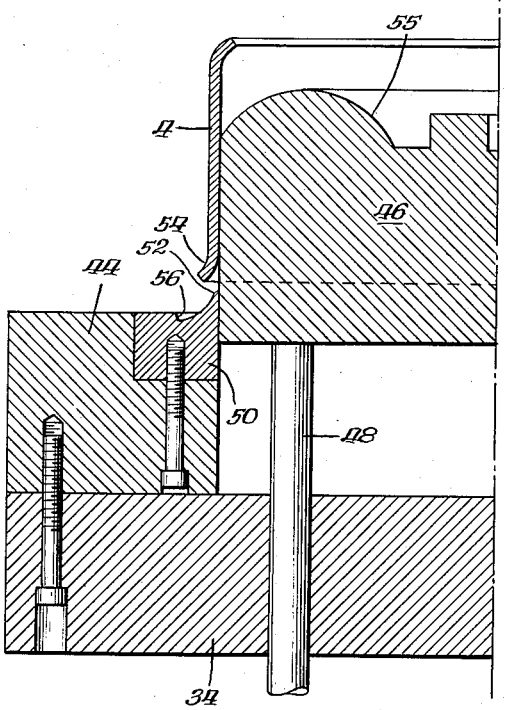

May 9, 1961 D. S. COX 2,983,033
METHOD OF MANUFACTURING DISHED DISKS AND THE LIKE
Filed Jan. 4, 1960 6 Sheets-Sheet 3
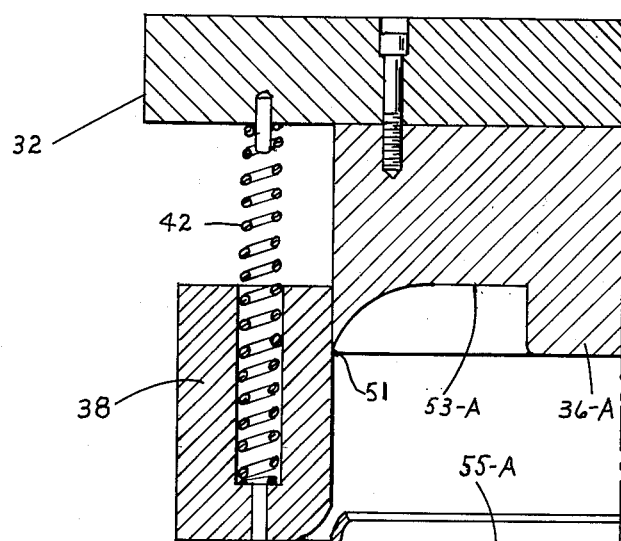
FIG. 10-A
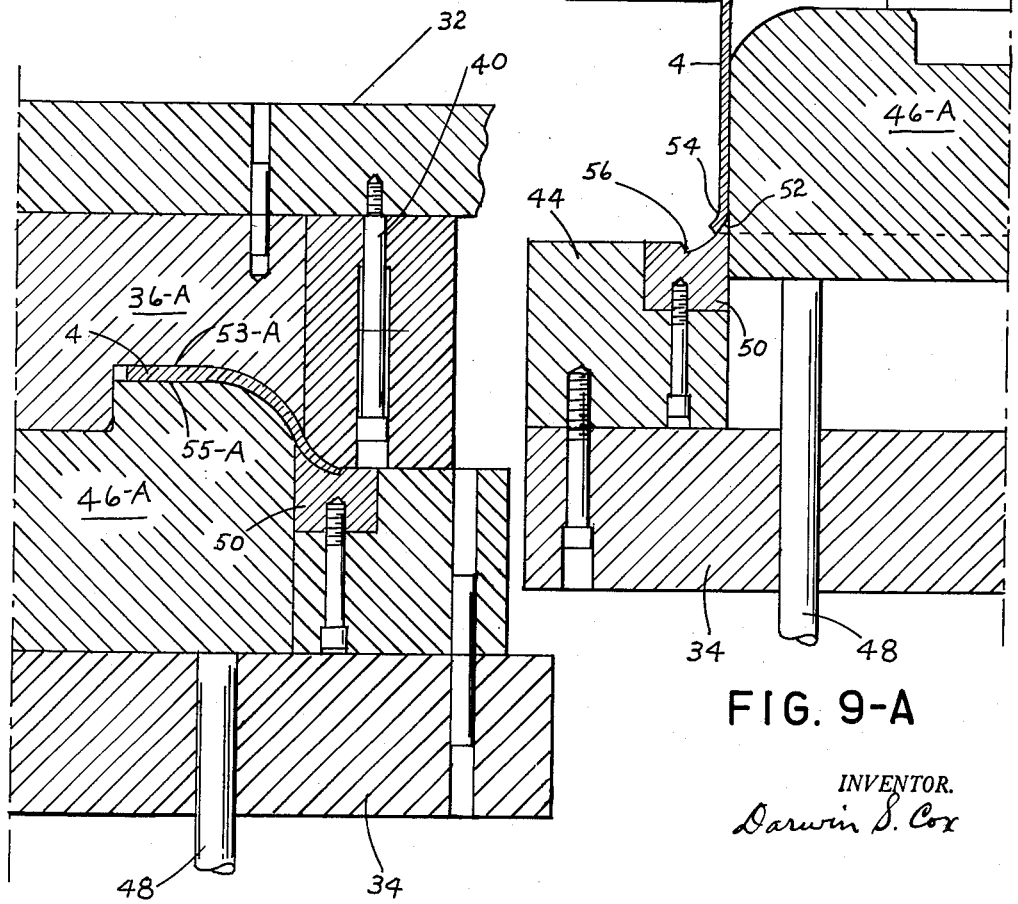
FIG. 9-A
INVENTOR.
Darwin S. Cox May 9, 1961 D. S. COX 2,983,033
METHOD OF MANUFACTURING DISHED DISKS AND THE LIKE
Filed Jan. 4, 1960 6 Sheets-Sheet 4
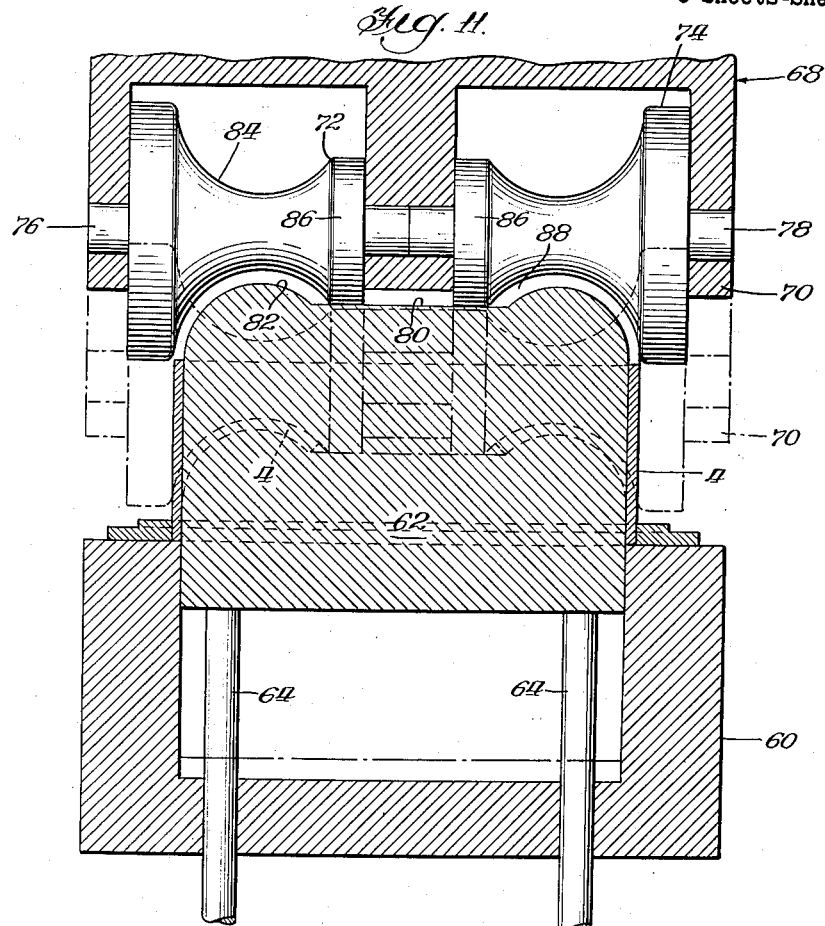
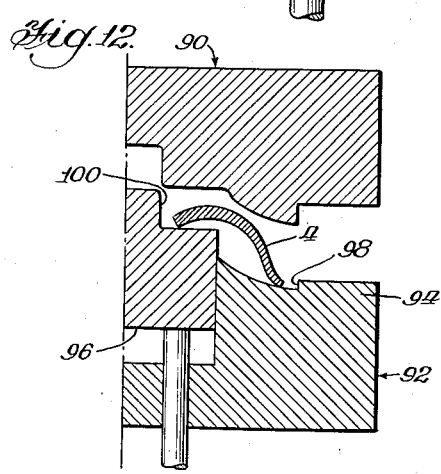
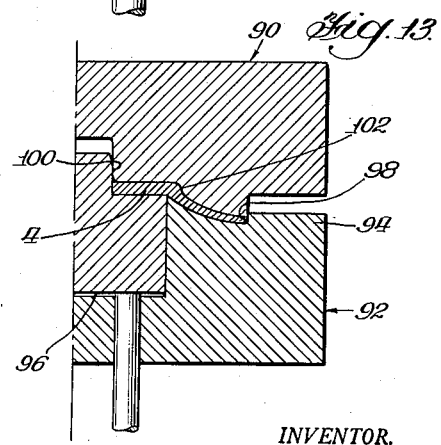
INVENTOR.
Darwin S. Cox May 9, 1961 D. S. COX 2,983,033
METHOD OF MANUFACTURING DISHED DISKS AND THE LIKE
Filed Jan. 4, 1960 6 Sheets-Sheet 5

INVENTOR.
Darwin S. Cox
BY
Neil J. Duncall
Atty.

United States Patent Office 2,983,033
Patented May 9, 1961

2,983,033
METHOD OF MANUFACTURING DISHED DISKS AND THE LIKE

Darwin S. Cox, 10712 S. Bell Ave., Chicago 43, Ill.

Filed Jan. 4, 1960, Ser. No. 1,398

11 Claims. (Cl. 29—159.01)

The invention relates to a novel method of manufacturing dished disks and similarly shaped objects and is particularly advantageous in the production of tapered centrally apertured wheel body elements commonly known as wheel disks.

This application is a continuation-in-part of application Serial Number 838,364, now abandoned, filed in my name September 4, 1959, as a continuation-in-part of my original application No. 587,693, now abandoned, filed May 28, 1956.

Considering, for example, a wheel disk which may be produced by the method, those familiar with the art will understand that the article is preferably formed to present a relatively thick central annular portion and tapers radially outwardly therefrom to approximately the peripheral edge of the disk. In its final form the article is, of course, deeply dished. Additionally, hand holes, other apertures, bosses or the like may be formed in the article as the requirements of a particular design demand. A major problem facing the wheel producing industry today is the production of this and similarly shaped articles in the most economical manner possible. With this in mind and considering the fact that due to the high cost of raw material, in this case steel plate, the industry has, in past years, been bending every effort to substantially reduce and possibly eliminate scrap loss associated with such manufacture. It is further well known to those skilled in this art, that scrap loss could be effectively reduced if some method could be devised of producing the article from a cylindrically wrapped and welded plate. However, in spite of the extensive investment in time and equipment, a satisfactory, economical and commercially feasible method of so producing this type of article has not been discovered.

Accordingly, it is the general object of my invention to provide a unique method of manufacturing articles of the type here under consideration that will satisfy the long felt demands of commercial production.

It is a further object of the invention to provide a method of manufacturing the considered articles that combines certain unique die and spinning operations.

Particularly, the invention comprehends utilizing a cylindrically wrapped and end welded blank and thereafter subjecting said blank to certain operations to preform, gather and thicken certain areas of the blank material in a determined manner to effectively transform the comparatively long cylinder to a relatively flat, ring shaped, centrally apertured disk having an inner diameter considerably smaller than the inside diameter of the cylinder. In the case of wheel disks this blank may then be spin formed to an appropriate contour and cross-section. It has been discovered that by using the overall or general combination of steps in my method in the production of the wheel disks, there results an article that meets and often surpasses all required design specifications, and additionally, such article is produced at a major cost saving when compared with the various methods heretofore used in the art. Further, I have found that certain subcombinations of the steps herein disclosed have utility in the manufacture of other articles of generally dished or ring shape form that have heretofore been produced by stamping from sheet stock thereby involving the loss of corners and center cutout material. It will also be understood that the particular operations employed in my method, and the sequence thereof, tends to work harden and strengthen the article with the result that cheaper, lower carbon or alloy steels may be used in the manufacture of many articles.

Figure 2:
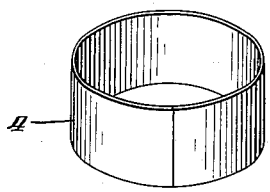
Figure 3:
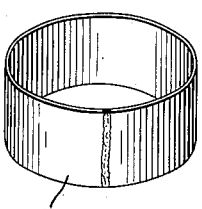
Figure 5:
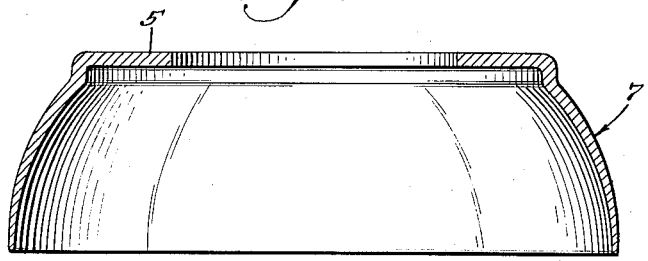
Figure 4:
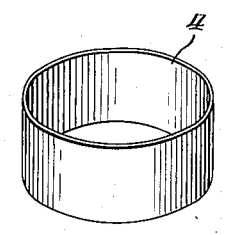
Figure 6:
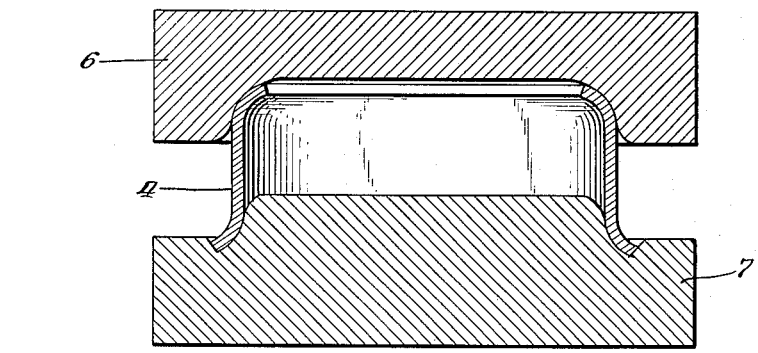
Figure 7:
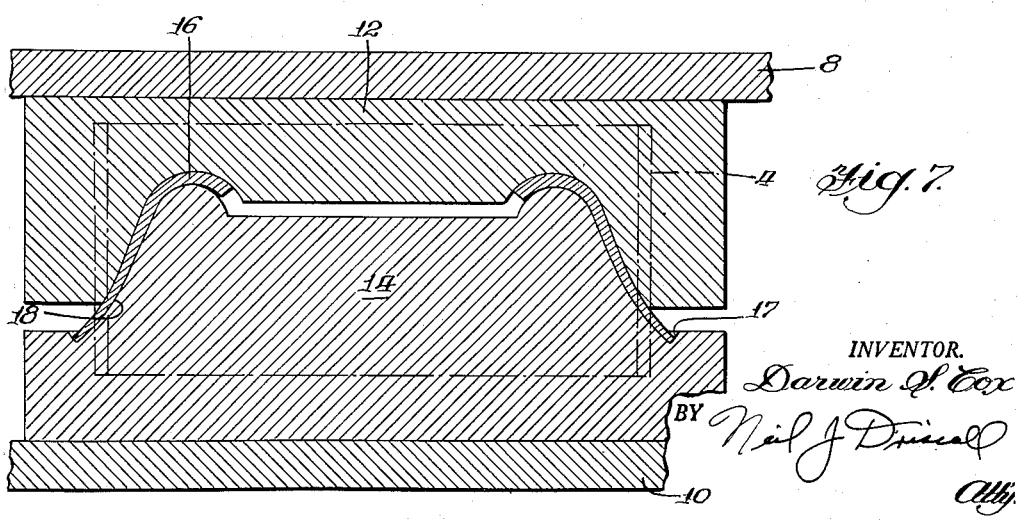
Figure 14:
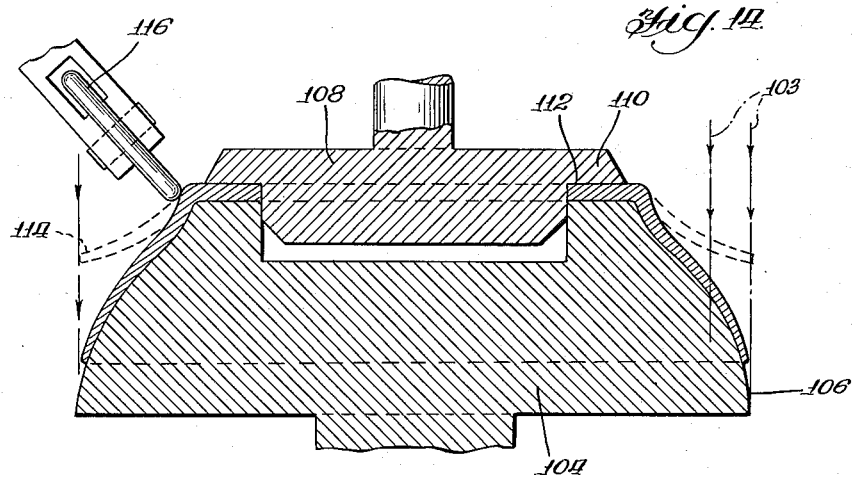
Figure 15:
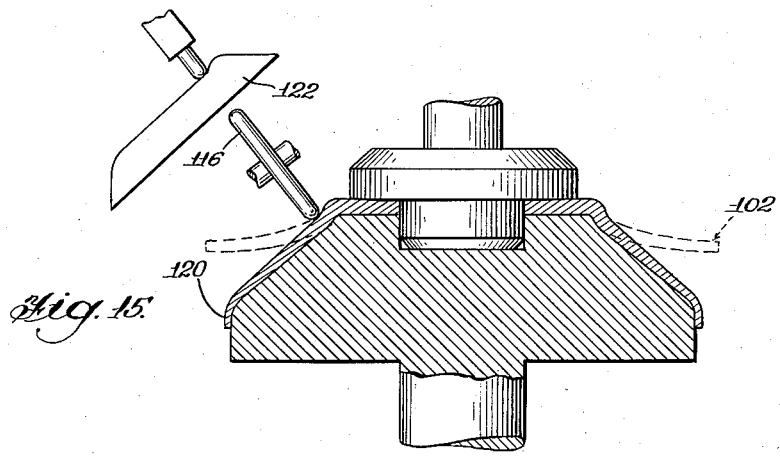
Figure 16:
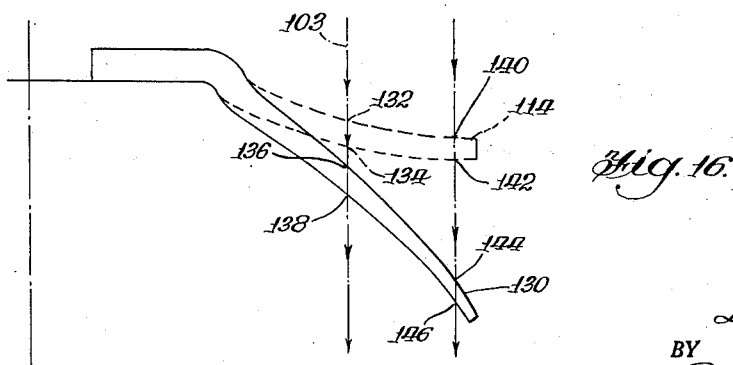
Figure 17:
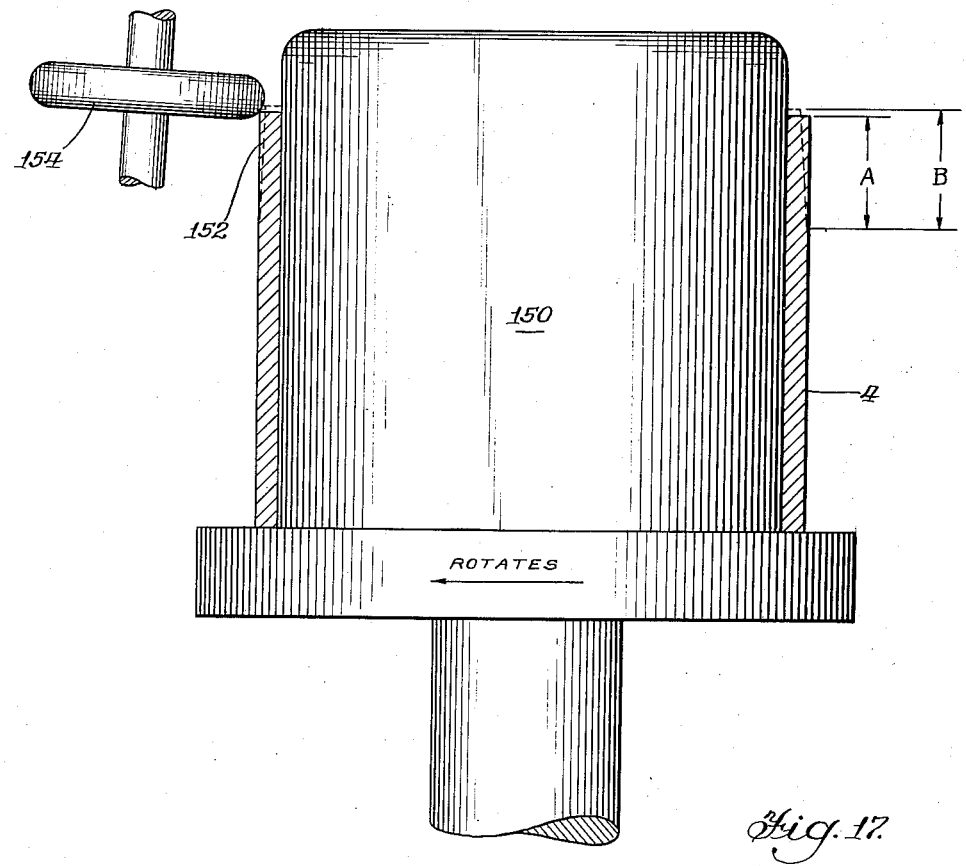
Figure 18:
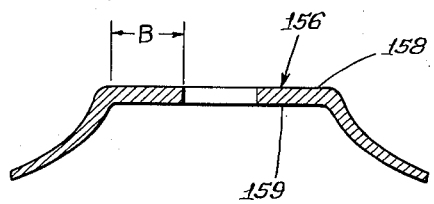

These and other objects of the invention will become apparent in the course of the following description and from an examination of the concerned drawings, wherein:

Figure 1 is a perspective view of a flat plate from which the disk will be formed, Figures 2, 3, and 4 illustrate the formation of the wrapped cylinder blank, Figure 5 is a cross-sectional view of a typical wheel disk formed by the method, Figure 6 is a sectional view of a suggested first die operation, Figure 7 is a sectional view illustrating a curling and flaring operation, Figure 8 is a fragmentary, sectional view illustrating an alternate curling operation, Figures 9 and 10 are fragmentary, sectional views illustrating yet another alternate curl and slight flare operation, Figures 9-A and 10-A are fragmentary, sectional views illustrating a variation of the operation shown in Figures 9 and 10, Figure 11 is a sectional view illustrating yet another alternate curling operation, Figures 12 and 13 are fragmentary, sectional views illustrating a sequential die forming operation, Figure 14 is a sectional view illustrating a typical sequential spinning operation, Figure 15 is a sectional view illustrating an alternate sequential spinning operation, Figure 16 is a fragmentary schematic view graphically illustrating the action during the spinning operation, and Figures 17 and 18 illustrate alternate steps that may be utilized in the process.

Describing the invention in detail and directing attention to Figures 1 to 5, it will be seen that the initial step comprises the shearing to size of a plate 2, in substantially rectangular form, from any convenient sheet stock. The material used may, of course, be appropriately selected with a view to the product being produced. It will be understood that the various dimensions of the plate should be properly determined with a view to the distribution of the metal in the subsequent operations. This may be critical in order to produce a product having the desired form and cross-section as well as avoiding unnecessary intermediate trim operations and consequent waste of material.

Subsequent to sizing, the plate 2 is rolled, in any conventional manner, into a cylindrical blank 4 having abutting ends. The abutting ends may then be welded as shown in Figure 3. It may be desirable to heat the blank 4 to a point just below the temperature where heavy scaling occurs, and then to weld the abutting ends while the blank is hot. This procedure may avoid an additional normalizing operation to relieve weld induced stresses. After welding, the blank 4 may be trimmed of excess weld material in any conventional manner. A smooth, generally homogeneous cylindrical blank is thus produced.

In the manufacture of certain articles, or where a particular metal is employed and/or a particular type of welding operation is required, it may be desirable to heat and/or normalize the blank to completely remove weld induced stresses or for other reasons. If such heating or normalizing step is utilized, it will be desirable to remove any scale caused thereby to avoid abrasive action on the dies, and any suitable scale removing process could be employed.

Figure 6 illustrates opposed die members 6 and 7 arranged to close on blank 4 and slightly pre-curl opposed ends thereof to facilitate certain subsequent alternate die operations as will hereinafter be explained in detail. In certain operations, it may only be necessary to pre-curl one end of the blank 4, or the pre-curl may be omitted entirely.

After trimming, the first forming operation illustrated in Figure 7 may be performed. Considering this figure, it will be seen that the arrangement comprises opposed shoes 8 and 10 having respectively affixed thereto a female die member 12 and male die member 14. The blank 4 is illustrated in phantom in superimposed fashion and, for purposes of explaining this operation, it will be seen to comprise an upper section 16 and lower skirt section 18. As the die is closed, it will be particularly noted that the upper section 16 is curled inwardly into an inverted curl or hook-like form (as seen in cross-section), and that in such forming this section of the blank gathers and becomes thicker. This forming action lends itself to the production of the particular product (here wheel disks) by providing a desired central, annular, thick portion having an appropriate aperture located therein, without wrinkling and distortion occurring during the forming action. Additionally, the amount of gathering and thickening is accurately predetermined and allowed for in the original blank size by considering the desired final configuration and volume of material therein required. This gathering and curling action further has the desirable effect of work hardening the central section of the article produced. The lower or skirt section 18 may concurrently be enlarged in diameter and caused to flare changing the cross-section thereof. The male die member 14 is provided with an annular abutment 17 which continuously engages the lower edge of the skirt 18 to limit the expansion of the skirt 18 and to aid in the major gathering action of the upper section 16. This simplified type of curl die normally permits a diameter reduction of only about twenty percent (20%) before wrinkles will start to form in the portion being gathered inward.

Considering now the modification illustrated in Figure 8, it will be understood that only a quarter section of the arrangement is shown and the parts are symmetrically arranged about the central vertical axis. The die comprises an upper female portion, indicated generally at 20, and a lower male portion, indicated generally at 22. The portion 20 may include a central, movable segment 24 arranged to aid in confining the material and to act as an ejector or knockout should the formed blank tend to cling to the upper die. The male portion 22 may include a central forming segment 26 arranged to coact with the upper die and guide and confine the material as it gathers while curling inwardly. A lower die segment 28 and a blank guiding segment 30 are also provided. It will be noted, that a major portion of the blank 4 is here curled inwardly in arcuate, hook-like form as it may be desirable in some product designs not to flare one end of the cylindrical blank outwardly as in the embodiment of Figure 7. It will, however, be understood that the upper portion of blank 4 is again gathered and thickened and work hardened during this operation. This type of curl die will normally permit up to about forty percent (40%) reduction on diameter before wrinkles or buckling will occur.

Considering Figures 9 and 10, which show a modified curling operation generally preferred where major amounts of diameter reduction are required to obtain relatively small central apertures, it will be seen that the blank 4 has had its opposed ends slightly pre-curled as shown in Figure 6. Again only quarter-sectional views are shown, it being understood that the various parts are symmetrically arranged about the central vertical axis of the die. The die comprises opposed shoes 32 and 34, the shoe 32 carrying a female member 36 and a vertically floating confining ring 38. The ring 38 is movably supported by stripper bolts 40 and has a plurality of peripherally arranged pressure springs 42 interposed between itself and the shoe 32. The shoe 34 comprises a fixed guide ring 44 movably guiding and receiving the male member 46, the latter engaging a plurality of cushion pins 48 which provide, in the conventional manner, appropriate yieldable resistance to vertical movement of said male member. The guide ring 44 is also provided with an annular hardened insert 50. The member 36 and 46 are provided with annular, complementing surfaces 53 and 55 which define a cavity having a volume proportioned to the amount of thickening occurring. The pre-curl of the opposed ends of the blank 4 avoids blank galling due to possible catching of the blank at the annular lips 51 and 52 of the member 36 and insert 50 immediately adjacent the movable die parts.

Upon die closure the skirt section 54 is flared outwardly and the end thereof is brought into abutting and confining contact with an annular ledge 56. The member 38 slidingly engages the outer peripheral surface of blank 4 to confine same and prevent product wrinkling and distortion. Again the upper section of the blank 4 is curled inwardly to gather and thicken and accomplish substantial diameter reduction without unwanted article deformation. Figure 10 illustrates the completed operation.

It has been found that the type of pressure yielding curl operation shown in Figures 9 and 10 makes it possible to curl the material inward more than sixty-five percent (65%) on diameter in one operation. The cold working taking place, when the diameter is so greatly reduced, generally is so severe as to harden the material to the point where the parts readily crack during subsequent forming operations. This problem of cracking can, of course, be overcome by annealing. Where parts are so severely cold worked in the curl operation that they require annealing, it is generally advisable to curl the material inward to within about 25 to 35 percent of the final desired center hole diameter, then anneal the part before gathering the material inward the balance of the way. This method of curling in two operations with an anneal stage in between permits accurate control of the cold worked hardness in the finished part and maximum disk strength can be obtained.

Figures 9-A and 10-A indicate a slightly modified version of the curl die shown in Figures 9 and 10. Here the members 36-A and 46-A are provided with annular, complementing surfaces 53-A and 55-A which define a modified cavity again having a volume proportioned to the amount of thickening occurring. In this modified cavity it will be noted the material curls inward and toward the blank axis without curling beyond the ninety degree (90°) point in relation to said axis.

Due to product design or preference of the tool engineer, when using the teachings as outlined herein, it may be desirable to curl the material inward and toward the blank axis, as shown in this modified operation Figures 9-A and 10-A, without curling beyond the ninety degree (90°) point. Generally, more material can be uniformly gathered inward and greater final diameter reduction can be obtained, however, when the curl cavity is designed to progress into a generally arcuate hook like shape as shown in Figures 9 and 10.

Under certain conditions it may be desirable to employ an alternate method of providing the described thickening and gathering action of the blank. To illustrate, attention is directed to Figure 11 wherein 60 indicates a stationary die block having a central, vertically movable mandrel or form control member 62 therein. Retractable pressure pins 64 may engage the member 62 to provide controlled, pressure resisting downward movement of the member 62 under the action hereinafter described. An upper assembly, indicated generally at 68, may comprise a generally hollow housing 70 having a plurality of rollers 72 and 74 arranged therein for independent rotatable movement about their respective axes 76 and 78. In some applications it may be desirable to use only a single roller, and in others three, four or more rollers may be used. It will be noted that the assembly 68 is arranged for pressured movement downwardly in response to the action of an associated ram or the like (not shown) and that the assembly 68 continuously rotates about the vertical central axis of the arrangement during this downward movement.

The member 62 is provided with a central upwardly facing flat portion 80 which is surrounded by an annular, upwardly arcuate form section 82. The rollers 72 and 74 are provided with concave surfaces 84, 84 and inner rolling surfaces 86, 86, the latter being rollably engageable with the portion 80 whereby the surfaces 84 define, with the section 82, the desired forming aperture 88 to accommodate the inward curl, gathering and thickening of the material.

In this operation of this embodiment, the blank 4 is positioned on the block 60 surrounding the member 62 and appropriately clamped. The rotating assembly 68 forces the engaged member 62 to retract and forces the blank 4 to advance into the curved aperture 88. The rollers 72 and 74 are rotating about their own axes, and in confining line contact with the advancing material, whereby the blank is curled and gathered into proper form along the surface 82. The dotted lines typically illustrate the relation of the parts at the completion of the operation.

In the performing of the curling and gathering operation in any of the various ways hereinabove described, it will be appreciated that the upper portion of the relatively thick-walled, cylindrical blank is considerably reduced in diameter. Those familiar with the art will understand the difficulty of accomplishing such a reduction in the first instance when working with blanks having the physical dimensions here contemplated and especially without any attendant product wrinkling, tearing or galling. As the metal is urged to move arcuately and inwardly becoming thicker as it gathers, the compressive forces built up within the material cause relatively high frictional forces to develop along the working surfaces of the forming dies or members and especially along the surfaces of the upper die member. I have discovered that the concentration of these forces has resulted, in prior art efforts to accomplish the diameter reduction contemplated, in product spoilage due to tearing, wrinkling, galling or the like and therefore has limited diameter reduction. Considering the disclosed operations, it will be remembered that the material is curled arcuately inwardly developing great frictional resistance along the upper die surface during the first ninety degrees of traverse. As the curl progresses beyond the ninety degree point the curling action tends to relieve the concentration of resistive forces on the outer surface of the blank in this area. Although some products may not require that the part be curled beyond the ninety degree point, it is believed this shifting of forces from the outer surface and the changing degree of resulting compression lines, when curling beyond the ninety degree point, helps in obtaining greater diameter reduction and more perfect parts.

A particular advantage of the disclosed curling operation relates to the fact that with most materials and product designs, diameter reduction and thickening may be accomplished without heating the blank, thereby obtaining the advantages of cold working, for example, additional strength and hardening, as well as avoiding die and blank abrasion resulting from heat created scale or oxides. However, with certain materials or designs it may be desirable to heat the blank immediately before or during the curling operation to facilitate same.

The next step involves reforming the now curled blank into a relatively flat annular disk which facilitates final forming.

Considering quarter-sectional Figures 12 and 13, it will be seen that the die comprises an upper female member 90 and a lower male member 92. The male portion may comprise an outer annular element 94 and a central, independently movable element 96. The element 94 may be provided with an abutment 98 to limit radial movement of the blank in an outward direction and the element 96 may be optionally provided with a shoulder 100 to limit movement of the blank in an inward direction. As the die closed, the inner or thickened section is formed into a substantially common plane and further work hardened and the outer section is flared outwardly and changed in cross-section. Thus it will be seen that the cylindrical blank 4 has been formed into a relatively flat centrally apertured, annular element 102 suitable for further forming wtih a virtual elimination of scrap loss.

It will be noted that though the curled blank illustrated in cross-section corresponds to the one formed in Figure 10, any of the curled blanks formed as hereinabove explained may be flattened and flared by merely providing minor die variations from that here shown.

In the manufacture of wheel disks, the preformed and flattened element 102 may be subjected to a spinning operation and to illustrate a typical example thereof attention is directed to Figure 14. It will be seen that the spinning operation employs a spinning mandrel 104, said mandrel having a peripheral surface 106 formed to a desired shape. A clamping member 108 is provided with a flanged edge portion 110 which engages and firmly clamps the now substantially flattened central portion 112 between its lower horizontal surface and an upwardly facing horizontal surface of the mandrel 104. In this manner the element 102 is firmly held in position and thereafter the mandrel, blank and clamping member are rotated about a central axis at a desired speed to properly accommodate the spinning operation.

It will be particularly noted that the flared outer skirt section 114 of the blank is now held in spaced relation to the surface 106 of the mandrel. To begin the spinning operation, at least one roller 116 may be forcibly brought into pressured contact with the section 114 at a point near the outer edge of the section 112. If desired, a plurality of rollers may be concurrently employed in the operation. This point of initial contact is in the area of the beginning of the spacial relation between the section 114 and the surface 106 of the mandrel. The pressured action of the roller is such that it is moved downwardly and outwardly in a path substantially paralleling the surface 106 of the mandrel making appropriate allowance for element tapering where desired. As a result of the roller action, metal in the section 114 is moved in a direction substantially paralleling the axis of rotation of the mandrel until concentric segments thereof are brought into contact with the mandrel surface 106. The metal movement herein accomplished is graphically illustrated by the phantom arrows 103 and is such that the overall diameter of the blank is not substantially increased from the diameter of the blank before the spinning operation. In fact, it is preferable, that the diameters of the blank both before and after this operation be substantially equal though it is possible to achieve limited gathering or expanding action in the outermost areas of section 114.

Figure 15 illustrates a slightly modified spinning operation wherein the element 102 is formed, under the action of roller 116, to a conical form having a cylindrical lip 120 at the outer edge thereof. If desired the roller movement may be guided by a conventional tracer attachment (not shown) which operatively engages a template 122. It will also be noted that this operation results in a desired cross-sectional thinning and tapering of the metal in the section 114.

Figure 16 graphically illustrates the thinning and tapering action resulting from the spinning operation. Considering the metal movement lines 103, which generally parallels the axis of rotation, it will be understood that the distance between points 132 and 134 on the section 114 is substantially equal to the distance between the points 136 and 138 of section 130. Further, the distance between points 140 and 142 substantially equals the distance between 144 and 146. However, the cross-sectional thickness of any of the points on section 130, measured perpendicular to its surface, is less than the associated mentioned distance and illustrates the thinning and tapering action. I have found that by controlling metal movement in this manner, the desired cross-sectional shape and area of a given article can be accurately predetermined. In addition, this operation, preferably performed in one pass, work hardens the section to complement the previously work hardened central section.

Referring to Figure 5 it will be noted that the hub portion of the wheel disk is comparatively thick in cross-section while the radially outer portions are provided with a pronounced taper to the outer extremity thereof. It will be recalled that such is a typical form desired in this product and it will be now understood that the steps disclosed produce the desired product with a minimum material loss.

After the article has been substantially formed by using the herein disclosed operations, a given product design may require further final sizing operations, such as piercing for bolt holes or the like, chamfering, slight trimming, or whatever the nature of the product design demands.

If it is desired to avoid the mentioned trimming to final size in the flattened central or bolting section of the disk to achieve parallel upper and lower surfaces or die forming to provide staggered upsets of the same section to simulate parallel surfaces thereof, the additional steps illustrated in Figures 17 and 18 may be employed.

Considering Figure 17 it will be understood that the cylinder 4 is, after forming, placed on a mandrel 150 and rotated therewith. A controlled roller 154 is brought into contact with a determined upper portion of the cylinder 4 to impart thereto a slight taper at the upper cylinder portion 152. It will be noted that the cylinder length at the part 152 is slightly elongated as indicated by the larger distance B as compared to the original distance A. Before tapering it will be understood, that the axial length of the pretapered section will be determined with a view to the total radial length B of the central flat section 156 (Figure 18) and the amount or degree of initial taper imparted will be in determined relation to the extent of the curling and anticipated thickening in the next operation.

The now pre-tapered cylinder is then subjected to the curling operation as, for example, is illustrated in Figure 10. Upon curling, the same thickening in proportion to the amount of inward curl occurs as heretofore described. However, the pre-tapered section 152 thickens to parallel upper and lower surfaces rather than the relatively slight taper inherent in the hereinbefore disclosed steps.

Thereafter, the now curled and slightly flared blank is subjected to the operation of Figures 12 and 13. Directing attention to Figure 18, which illustrates the blank after the operation of Figure 13, it will be understood that as a result of the pre-tapering operation described, parallelism between the surfaces 158 and 159 of the section 156 is achieved without the requiring of slight trimming, die forming to final size hereinbefore mentioned.

It will be understood that the invention as disclosed is by way of illustration and not limitation and that the combinations and subcombinations thereof may be subject to various modifications without departing from the spirit of the invention or the scope of the appended claims.

I claim:

1. In a method of manufacturing tapered wheel disks comprising forming a rectangular plate, wrapping the plate into a straight cylindrical blank with abutting edges, welding the abutting edges, beginning at one end of the blank and curling and gathering a substantial portion of the total axial length of said blank inwardly toward the blank axis to taper-thicken said portion by confining the blank and forcing it between two die surfaces of determined shape while continuously applying a yielding pressure to the surfaces of said substantial portion, forming only a radially inner first part of the substantial portion into a common plane substantially perpendicular to said axis to provide a substantially flat central annular section, die-forming to flare outwardly the remaining portion of the original blank length and to change the cross-sectional contour of the remaining part of said substantial portion to provide a tapered skirt in generally acute angular relation with a planar extension of said flat central section, spin-forming the tapered skirt on a mandrel, said mandrel having a surface of determined configuration initially in variable spaced relation to said skirt, said spin-forming comprising simultaneously rotating the blank and mandrel about their coinciding axes and moving at least one spinning tool forcibly into engagement with successive radially increasing annular portions of the skirt to move the skirt along lines generally paralleling said axes until contacting the surface of the mandrel, to further taper said skirt and to form same into a predetermined dished contour.

2. A method of manufacturing tapered wheel disks according to claim 1, wherein said die-forming comprises first flaring said remaining portion of said original blank length to a first diameter larger than the original cylinder diameter, said first flaring being accomplished simultaneously with said curling and gathering, and thereafter simultaneously forming said section and said tapered skirt.

3. A method of manufacturing tapered wheel disks according to claim 2, wherein said tapered skirt is formed to a predetermined diameter larger than said first diameter, said spin-forming including substantially maintaining said predetermined diameter.

4. A method of manufacturing tapered wheel disks according to claim 3, and including slightly pre-curling and flaring opposed ends of the cylindrical blank prior to said curling and gathering.

5. In a method of manufacturing metallic tapered wheel disks comprising providing a hollow cylindrical blank having a determined axial length and volume of metal therein, die-forming the blank by forcibly feeding one end thereof into an annular generally arcuate preformed die space of determined radially inwardly increasing volume to gather a major portion of said axial length toward said blank axis and thicken said major portion, simultaneously with said forcible feeding applying a yielding pressure over the surface of said major portion, further die-forming the blank to provide an annular substantially flat section as seen in cross-section adjacent and surrounding said axis, said further die-forming including providing a skirt portion of predetermined configuration and outwardly tapered cross-section flaring from and surrounding said flat section, said predetermined configuration and tapered cross-section being such that the thickness of each radially annular segment of the skirt portion is determined with a view to the distance it will be moved parallel to the blank axis in the subsequent spinning operation, and then spin forming said skirt portion by placing the blank on a mandrel having a surface of predetermined shape initially in variable spaced relation to the skirt portion, rotating the blank and mandrel about a common axis, and forcibly bringing a spinning tool into engagement with the skirt portion and moving said spinning tool against radially increasing annular segments of the skirt portion to move each of said segments in a direction generally paralleling said axis and thereby bringing the skirt portion into engagement with said surface to axially elongate said skirt portion and to further taper-thin same, and then die-forming the blank to final size.

6. In a method of forming a dished article comprising providing a straight, hollow, cylindrical blank having a predetermined axial length, wall thickness, and volume of metal; distributing the metal in the blank by contracting one end of the blank and a substantial portion of the axial length of said blank to reduce the diameter, taper and increase the wall thickness of said substantial portion; concurrently with said contracting maintaining a yielding pressure on the surfaces of said contracting portion to keep them smooth and wrinkle-free; further die-forming a generally planar section adjacent the blank axis and forming a skirt flaring radially outwardly and angularly from said planar section; and then redistributing the metal in the skirt by spinning and thinning same to elongate the skirt by moving the metal therein in a direction paralleling the blank axis.

7. In a method of forming a dished article comprising providing a straight, hollow, cylindrical blank having a predetermined axial length and volume of metal and having a wall of generally uniform thickness; forming a slight taper in the wall in a determined peripheral area adjacent one end of the blank; distributing the metal in the blank by contracting said one end of the blank and a substantial portion of the axial length of said blank to reduce the diameter and increase the wall thickness of said substantial portion and taper an annular segment thereof; concurrently with said contracting maintaining a yielding pressure on the surfaces of said contracting portion to keep them smooth and wrinkle-free; further forming a flat section having parallel upper and lower surfaces adjacent the blank axis and forming a skirt flaring radially outwardly and angularly from said flat section; and then redistributing the metal in the skirt bp spinning and thinning same to elongate the skirt by moving the metal therein in a direction generally paralleling the blank axis.

8. A method of forming a dished article according to claim 7, wherein said slight taper is formed in the wall by roller engaging said area.

9. In a method of manufacturing metallic tapered wheel disks comprising providing a hollow cylindrical blank having a determined axial length and volume of metal therein, forming an annular taper at one end of the blank, die-forming the blank by forcibly feeding said one end thereof into an annular generally arcuate pre-formed die space to gather a major portion of said axial length toward said blank axis to uniformly thicken one segment of said major portion and taper thicken the remaining segment of said major portion, simultaneously with said forcible feeding applying a yielding pressure over the surface of said major portion, flaring the remaining portion outwardly, further forming the blank to provide an annular flattened section having opposed parallel surfaces as seen in cross-section adjacent and surrounding said axis, said flattened section being formed from said one segment, said further die-forming including providing a skirt portion of predetermined configuration and outwardly tapered cross-section flaring from and surrounding said flat section, said predetermined configuration and tapered cross-section being such that the thickness of each radially annular segment of the skirt portion is determined with a view to the distance it will be moved parallel to the blank axis in the subsequent spinning operation, and then spin forming said skirt portion by placing the blank on the mandrel having a surface of predetermined shape which initially is in variable spaced relation to the skirt portion, rotating the blank and mandrel about a common axis, and forcibly bringing a spinning tool into engagement with the skirt portion and moving said spinning tool against radially increasing annular segments of the skirt portion to move each of said segments in a direction generally paralleling said axis and thereby bringing the skirt portion into engagement with said surface to axially elongate said skirt portion and to further taper-thin same.

10. In a method of forming a dished article comprising providing a hollow cylindrical blank of determined uniform axial length and determined wall thickness throughout said length; contracting one end of the blank and a substantial portion of the axial length to redistribute the metal therein by reducing the diameter and increasing the wall thickness of said substantial portion; applying a yielding pressure on said substantial portion during said contracting to inhibit wrinkle formation therein; forming a generally planar section adjacent the blank axis and a tapered skirt flaring radially outwardly and angularly from said planar section; and then redistributing the metal in the skirt by moving the metal therein in a direction generally paralleling the blank axis.

11. In a method of forming a dished article according to claim 10, wherein the contracting of said substantial portion comprises curling and gathering inward a determined amount, but not all of said substantial portion, annealing the blank to reduce the hardness therein, and thereafter completing said contracting of said substantial portion by further curling and gathering of said determined amount and the balance of said substantial portion to further reduce the diameter and obtain a determined degree of hardness therein.

No references cited.